United States Patent
Wiseman et al.

(10) Patent No.: US 7,603,222 B2
(45) Date of Patent: Oct. 13, 2009

(54) SENSOR DIAGNOSTICS USING EMBEDDED MODEL QUALITY PARAMETERS

(75) Inventors: Matthew William Wiseman, Fairfield, OH (US); Malcolm John Ashby, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 11/283,120

(22) Filed: Nov. 18, 2005

(65) Prior Publication Data

US 2007/0118270 A1    May 24, 2007

(51) Int. Cl.
G06F 19/00    (2006.01)

(52) U.S. Cl. .............................. 701/100; 701/29; 701/34

(58) Field of Classification Search ................ 701/100, 701/111, 36, 29–35, 3, 4, 8, 10; 703/3, 7, 703/8; 415/27, 28; 60/772, 773, 39.34
See application file for complete search history.

(56) References Cited

U.S. PATENT DOCUMENTS

| | | | |
|---|---|---|---|
| 5,377,112 A | 12/1994 | Brown, Jr. et al. | |
| 5,379,584 A | 1/1995 | Windish et al. | |
| 5,526,266 A | 6/1996 | Rutan et al. | |
| 5,552,711 A | 9/1996 | Deegan et al. | |
| 5,566,091 A | 10/1996 | Schricker et al. | |
| 5,594,665 A | 1/1997 | Walter et al. | |
| 5,912,627 A | 6/1999 | Alexander | |
| 6,157,310 A | 12/2000 | Milne et al. | |
| 6,298,718 B1 * | 10/2001 | Wang | 73/114.01 |
| 6,314,350 B1 | 11/2001 | Butz et al. | |
| 6,463,380 B1 | 10/2002 | Ablett et al. | |
| 6,466,858 B1 | 10/2002 | Adibhatla et al. | |
| 6,532,412 B2 | 3/2003 | Adibhatla et al. | |
| 6,535,124 B1 | 3/2003 | DiTommaso et al. | |
| 6,564,109 B1 | 5/2003 | Ashby et al. | |
| 6,741,919 B1 | 5/2004 | Schuster et al. | |
| 6,757,668 B1 | 6/2004 | Goebel et al. | |
| 6,823,253 B2 | 11/2004 | Brunell | |
| 6,868,325 B2 | 3/2005 | Menon et al. | |
| 7,020,595 B1 * | 3/2006 | Adibhatla et al. | 703/7 |
| 7,043,348 B2 * | 5/2006 | Uluyol et al. | 701/100 |

(Continued)

FOREIGN PATENT DOCUMENTS

JP    2001090554 A    4/2001

(Continued)

*Primary Examiner*—Richard M. Camby
(74) *Attorney, Agent, or Firm*—McNees Wallace & Nurick, LLC

(57) ABSTRACT

A method and system is provided for identifying in-range sensor faults in a gas turbine engine, by observing the tracked component qualities in an embedded model and recognizing anomalous patterns of quality changes corresponding to sensor errors. An embedded model of the engine is employed to estimate sensed parameters such as rotor speeds, temperatures and pressures, as well as other parameters that are computed based on input parameters. Each major rotating component of the engine, including the fan, compressor, combustor, turbines, ducts and nozzle is individually modeled. Sensor failures are detected by identifying anomalous patterns in component quality parameters. A library of anomalous patterns is provided for comparing quality parameters generated by a tracking filter with the library of anomalous patterns. If a pattern is matched, a sensor may be eliminated from the tracking filter and the estimated model parameter used to avoid corrupting the model quality parameters.

17 Claims, 4 Drawing Sheets

U.S. PATENT DOCUMENTS

| | | |
|---|---|---|
| 7,222,002 B2 * | 5/2007 | Maine .......................... 701/3 |
| 2004/0088100 A1 | 5/2004 | Volponi |
| 2005/0107942 A1 | 5/2005 | Nomura et al. |

FOREIGN PATENT DOCUMENTS

| | | |
|---|---|---|
| JP | 2001329856 A | 11/2001 |
| JP | 2002180851 A | 6/2002 |
| JP | 2004232643 A | 8/2004 |

* cited by examiner

SENSOR DIAGNOSTICS USING EMBEDDED MODEL QUALITY PARAMETERS

FIELD OF THE INVENTION

The present invention is directed to a method and system for controlling a gas turbine engine, and more particularly to a method and system for detecting in-range sensor failures using a parameterized component level model (CLM) representing the major rotating components of the engine.

BACKGROUND OF THE INVENTION

Existing gas turbine engines typically utilize a digital/electronic engine control system, often referred to as FADEC (Full Authority Digital Electronic Control). FADEC includes mathematical and computational models of various engine systems, sub-systems, and components. These mathematical/computational models are often used to predict and control the behavior of engine systems, sub-systems, and components. Prediction and control of engine behavior may utilize (1) feedback of actual engine behavior by means of sensors located in various parts of the engine (temperature, pressure, speed, etc.), (2) calculations and predictions of engine system, sub-system, and component behavior and (3) schedules describing desired or target system, sub-system, and component behavior under certain engine operating conditions.

Currently, embedded CLM tracking methods represent the major rotating components as individual modules. A tracking filter adjusts the component quality parameters in the CLM model to match the engine sensor values to the model-computed sensor values. The existing CLM methods assume that engine sensors are providing accurate information. FADEC performs sensor range, limit and signal validation. Out-of-range sensor failures are readily detected by FADEC logic but in-range sensor values are difficult to diagnose.

In order to predict and control engine behavior, the mathematical/computational models include information about the physical properties of the relevant engine systems, sub-systems, and components, such as physical size (dimensions, shape), coefficient of thermal expansion, modulus of elasticity, stiffness, time constants, and other physical, mechanical, and thermal properties. This information about physical properties is typically pre-programmed into the engine control system, and represents the physical condition of the engine system, sub-system, or component when new. During engine operation by the customer/user, changes in the physical properties of the engine systems, sub-systems, and components can occur over time. Examples of such changes are wear and distortion, which change the physical size and shape of the engine system, sub-system, or component. Such changes in physical properties often reduce or impair engine performance and efficiency, leading to increased fuel consumption, and reduced engine life. Unfavorable changes of this nature are referred to as deterioration. As an engine deteriorates and undergoes physical changes over time, the physical properties of the deteriorated engine system, sub-system, or components start to deviate from the physical properties that were originally pre-programmed into the engine control system. If direct feedback of the changing physical properties from the engine to the control system is not available (as is the case in contemporary engine control systems), then the control system cannot account for the physical changes. The resulting deviations between the deteriorated physical properties (in the engine), and the new physical properties (in the control system) introduce discrepancies into the mathematical computational models. These discrepancies impair the ability of the engine control system to accurately predict and control the behavior of the particular engine system, sub-system, or component. This can result in reduced efficiency and engine life, increased fuel consumption, and other unfavorable effects on engine performance.

The deviations between deteriorated and new physical properties are most frequently addressed by physical overhaul and maintenance, in which the physical properties are restored from the deteriorated condition to the new condition. This physical maintenance, sometimes referred to as performance restoration, is achieved either by replacement of the particular engine system, sub-system, or component with new hardware, or by physical processing (repair) of the hardware. However, physical overhaul and maintenance of this type is difficult, time consuming, inconvenient, and expensive. An effective method of addressing the control system deviation between the deteriorated and new conditions necessarily places a high degree of reliance on the engine sensors. If a sensor failure is undetected because its associated parameter is within a normal operating range, the system will track an erroneous parameter, resulting in a flawed updated model.

One method of detecting in-range sensor failure is disclosed in U.S. Pat. No. 6,314,350 B1. Sensor status monitoring logic compares current status of a sensor to previous status and generates a transition count indicating the number of times during a flight that each monitored sensor changed status. A time duration table records the amount of time status is recorded in each of its possible states. When the transition counter exceeds a predetermined threshold, the maintenance logic uses the transition counter output to generate a real-time maintenance message. The time duration table is also used to detect a pattern from the table so a type of default can be automatically detected and an appropriate post-flight maintenance message can be generated. The method detects intermittence, which may forecast sensor failures including in-range sensor failures, but the method assumes a fault based upon threshold settings, which may not accurately forecast a failure, resulting in unnecessary maintenance messages.

Therefore, there is a need for a diagnostic system for detecting in-range sensor faults by observing the tracked component qualities in an embedded model and recognizing anomalous patterns of quality changes corresponding to sensor errors.

SUMMARY OF THE INVENTION

The present invention discloses a method and system for identifying in-range sensor faults in a gas turbine engine, by observing the tracked component qualities in an embedded model and recognizing anomalous patterns of quality changes corresponding to sensor errors, and not to actual component quality changes.

An embedded model of the engine is employed to estimate sensed parameters such as rotor speeds, temperatures and pressures, as well as parameters such as stall margin, thrust and airflow, based on input parameters including environmental conditions, power setting and actuator position. The embedded model may be a physics-based model, a regression fit or a neural network model. One embodiment uses a physics-based aerothermodynamic engine model to individually model each major rotating component of the engine, including the fan, compressor, combustor, turbines, ducts and nozzle.

Sensor failures that are difficult to detect using conventional signal processing may be detected by identifying anomalous patterns in component quality parameters. Furthermore, an embedded model used for controlling the engine or for engine diagnostics may be prevented from following a "drifting" quality parameter caused by an in-range failed sensor, thereby avoiding corruption of the model-computed parameters used by the control or diagnostics system, if anomalous patterns in component quality parameters are detected.

One embodiment of the invention is directed to a method for detecting in-range sensor failures in a gas turbine engine, the method including the steps of providing component level model including a plurality of estimated operating parameters and quality parameters of a plurality of engine components; sensing a plurality of operating parameters associated with the plurality of engine components; comparing the plurality of sensed operating parameters to the plurality of estimated operating parameters of the component level model; generating a set of engine component quality parameters based on the comparison of the sensed operating parameters to the plurality of estimated operating parameters; storing a library of anomalous patterns, each pattern in the library of anomalous patterns having a plurality of known quality parameters consistent with the generated set of engine component quality parameters; and identifying a malfunctioning sensor in response to eliminating at least one sensed parameter of the plurality of sensed parameters in response to the generated set of engine component quality parameters matching at least one of the anomalous patterns.

In an alternate embodiment, the method may also include substituting at least one of the estimated operating parameters of the component level model for at least one of the sensed operating parameters in response to identifying the anomalous pattern. Additionally, the method may include the step of updating the estimated quality parameters of the component level model in response to comparing the plurality of sensed operating parameters to the plurality of estimated operating parameters.

In another embodiment, the present invention is directed to a control system for a gas turbine engine having a plurality of components. The control system includes a control module for transmitting control commands to the engine. A plurality of component sensors are provided for sensing at least one operating parameter associated with each component of the plurality of engine components. Also, a component level model (CLM) is provided for generating a plurality of estimated engine component parameters based on a predetermined engine model. The CLM has an individual model for each of the plurality of engine components. Each individual model includes at least one estimated operating parameter and a plurality of quality parameters.

The control system also includes a tracking filter to monitor changes in the sensed operating parameters with respect to the CLM estimated operating parameters, and generating an updated set of quality parameters based on the monitored changes. A pattern recognition module includes a data storage unit for storing a library of anomalous patterns, each pattern in the library of anomalous patterns having a plurality of known quality parameters that is consistent with the generated set of engine component quality parameters. The pattern recognition module also includes logic configured to identify when the updated quality parameters of the plurality of engine components matches at least one anomalous pattern of the plurality of anomalous patterns, and to determine a failed sensor in response to a matching set of generated quality parameters with at least one set of predetermined quality parameters.

In yet another embodiment, the present invention is directed to a component level model (CLM) of a gas turbine engine for generating a plurality of estimated engine component parameters, including an individual model for each of the plurality of engine components, each individual model having at least one estimated operating parameter and a plurality of quality parameters.

An advantage of the present invention is the ability to detect in-range sensor failures that would not otherwise be detected by conventional control systems which only detect sensor failures when the sensor values drift out of their normal range.

Another advantage of the present invention is that an engine model embedded within a control or diagnostic system may be prevented from following a failed in-range sensor, thereby corrupting the model computed parameters used by the control or diagnostic system.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
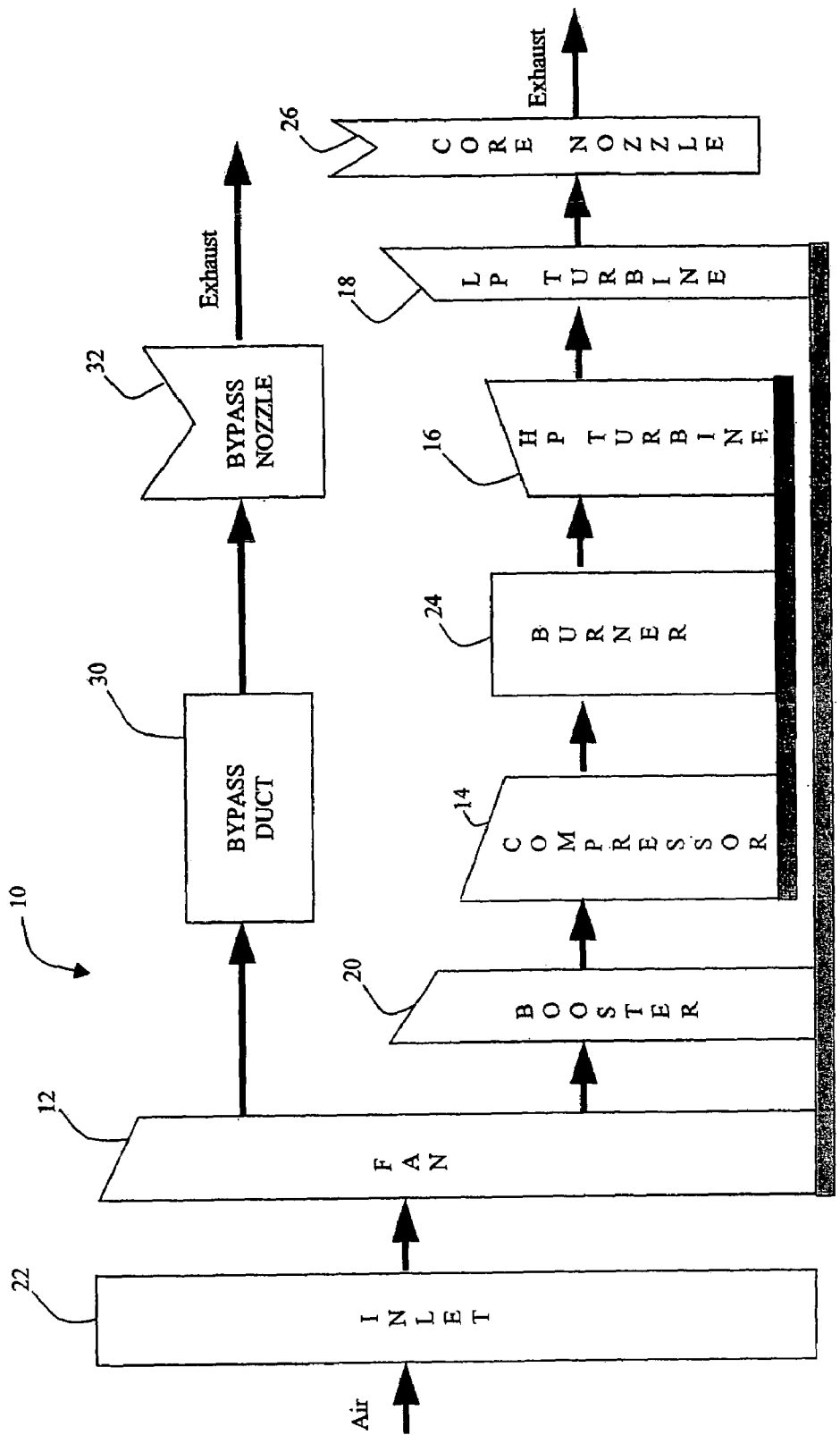
FIG. 1 is a schematic diagram of a physics-based embedded component level model.

Referring to FIG. 1, the Component Level Model (CLM) 10, as illustrated, represents a physics based model. An embedded model of the engine 10 is employed to estimate sensed parameters such as rotor speeds, temperatures and pressures, as well as parameters such as stall margin, thrust and airflow, based on input parameters. Input parameters include environmental conditions, power setting and actuator position. The embedded model may be a physics-based model, a regression fit or a neural network model. The preferred embodiment uses a physics-based aerothermodynamic engine model to individually model each major rotating component of the engine, including the fan 12, compressor 14, combustor 24, turbines 16, 18, duct, 30 and nozzles, 26, 32.

The CLM 10 is designed to be a fast running, transient engine cycle representation, with realistic sensitivities to flight conditions, control variable inputs and high-pressure compressor bleed. The quality parameters for the CLM comprise flow and efficiency modifiers for each major rotating component. Each of the fan 12, compressor 14, high-pressure (HP) turbine 16, low-pressure (LP) turbine 18, and in some cases, the booster 20, have a flow modifier and an efficiency modifier. This provides the CLM 10 with eight quality parameters, or ten quality parameters if the booster 20 is included. These quality parameters can be adjusted or perturbed from their nominal values, thereby affecting the model calculations. Proper manipulation of these quality parameters permits the model to simulate the behavior of a particular engine more precisely, to take into account the effects of manufacturing variations between engines, engine deterioration, or damaged engine parts. Perturbing the quality parameters of the CLM 10 allows for a better match of model-computed sensor values to actual engine sensor values.

The physics-based model has additional components that include the air inlet 22, the burner 24, the core nozzle 26, the bypass duct 30, and the bypass nozzle 32. The CLM 10 senses parameters associated with these components as well.

Assuming that the sensor values are accurate, the model quality parameters will reflect actual engine component quality levels when the sensed parameters are tracked over time with the model quality parameters. Tracking of the model quality parameters is accomplished through a tracking filter 48 (see generally, FIG. 2). These actual component quality levels can be used to diagnose engine problems. For example, a "large" bird strike on the fan will result in a "large" negative shift in the flow and efficiency of the fan 12 in the model 10. This negative shift is a result of the tracking filter 48 striving to match the model 10 outputs with the actual values generated by the engine sensors. If the damage caused by the bird striking the fan propagates to the compressor 14, a negative shift in the compressor quality parameters would also be observed in the CLM 10.

If a sensor experiences an in-range failure, however, the model 10 component qualities vary as the tracking filter 48 strives to align the model value with the erroneous sensor value. However, the variations in the quality parameters generated with the failed sensor vary from normal changes in quality parameters, where the normal quality parameters are associated with actual deterioration or damage in the gas path. For example, a drift in measured PS3 caused by an in-range sensor failure may result in the estimated HP turbine flow to decrease with a corresponding increase in the estimated compressor flow. Such a flow pattern is anomalous, or inconsistent with, actual flow patterns resulting from gas path damage or deterioration.

An anomalous pattern, defined as a set of estimated changes in quality parameters that are inconsistent with a likely physical gas path event, can be associated with certain in-range sensor failures. For example, a set of estimated quality changes that includes an increase in fan efficiency is unlikely to correspond to actual component quality changes, since fan efficiency will actually decrease as the engine deteriorates or is damaged. By identifying such patterns in the estimated quality parameters, in-range sensor failures can be detected.

Figure 2:
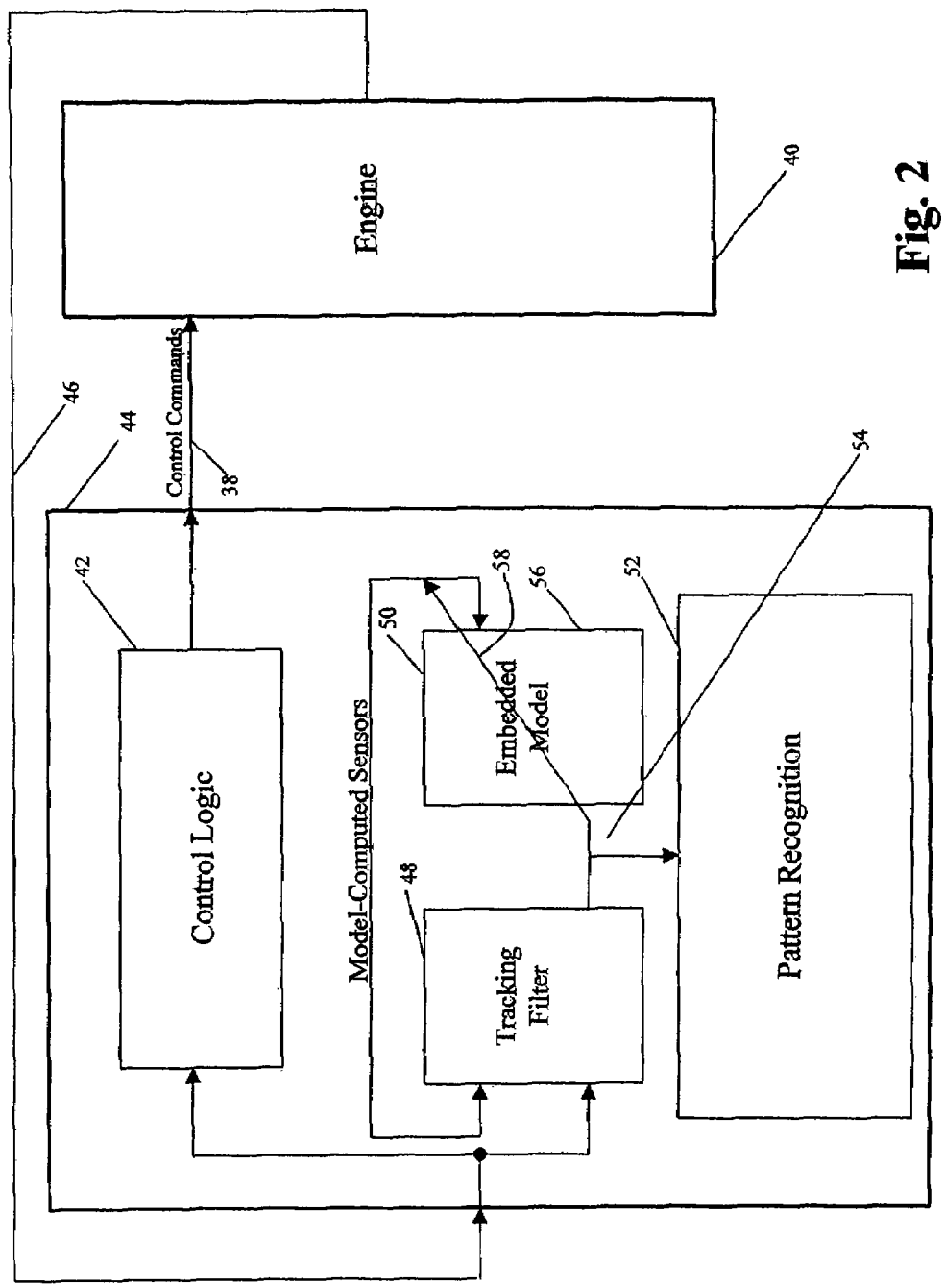
FIG. 2 is a block diagram of the present invention using embedded model quality parameters.

Referring to FIG. 2, a block diagram illustrates the system of the present invention. A control logic unit 42 in the FADEC 44 transmits control commands 38 to the turbine engine 40. The control logic unit 42 may include a processor, which may be implemented through a microprocessor and associated components such as RAM, I/O devices, etc. Parameters of the engine components are sensed and the sensed engine values 46 are returned to the input of the control logic unit 42 and a tracking filter 48. The tracking filter 48 compares the sensed engine values 46 with the model-computed values 50 generated from the embedded model 56. The tracking filter 48 generates an updated set of quality parameters 54, which are input to a pattern recognition module 52 to detect anomalous patterns. The pattern recognition module 52 includes a data storage unit containing a library of anomalous patterns. The anomalous patterns may be drawn from historical data, from which learning experience indicates a set of known parameters is anomalous, or may be generated from algorithms, that can determine for example, that an increase in engine efficiency over time is an anomalous pattern. The estimated quality parameters 54 are also used to update the embedded model 50, as indicated by arrow 58.

The embedded model of the engine 10 is employed to estimate sensed parameters such as rotor speeds, temperatures and pressures, as well as parameters such as stall margin, thrust and airflow, based on input parameters including environmental conditions, power setting and actuator position. The embedded model 10 may be a physics-based model, a regression fit or a neural network model. The disclosed embodiment uses a physics-based aerothermodynamic engine model to individually model each major rotating component of the engine, including the fan 12, compressor 14, combustor 24, HP turbine 16, LP turbine 18, bypass duct 30 and bypass nozzle 32.

Figure 3:
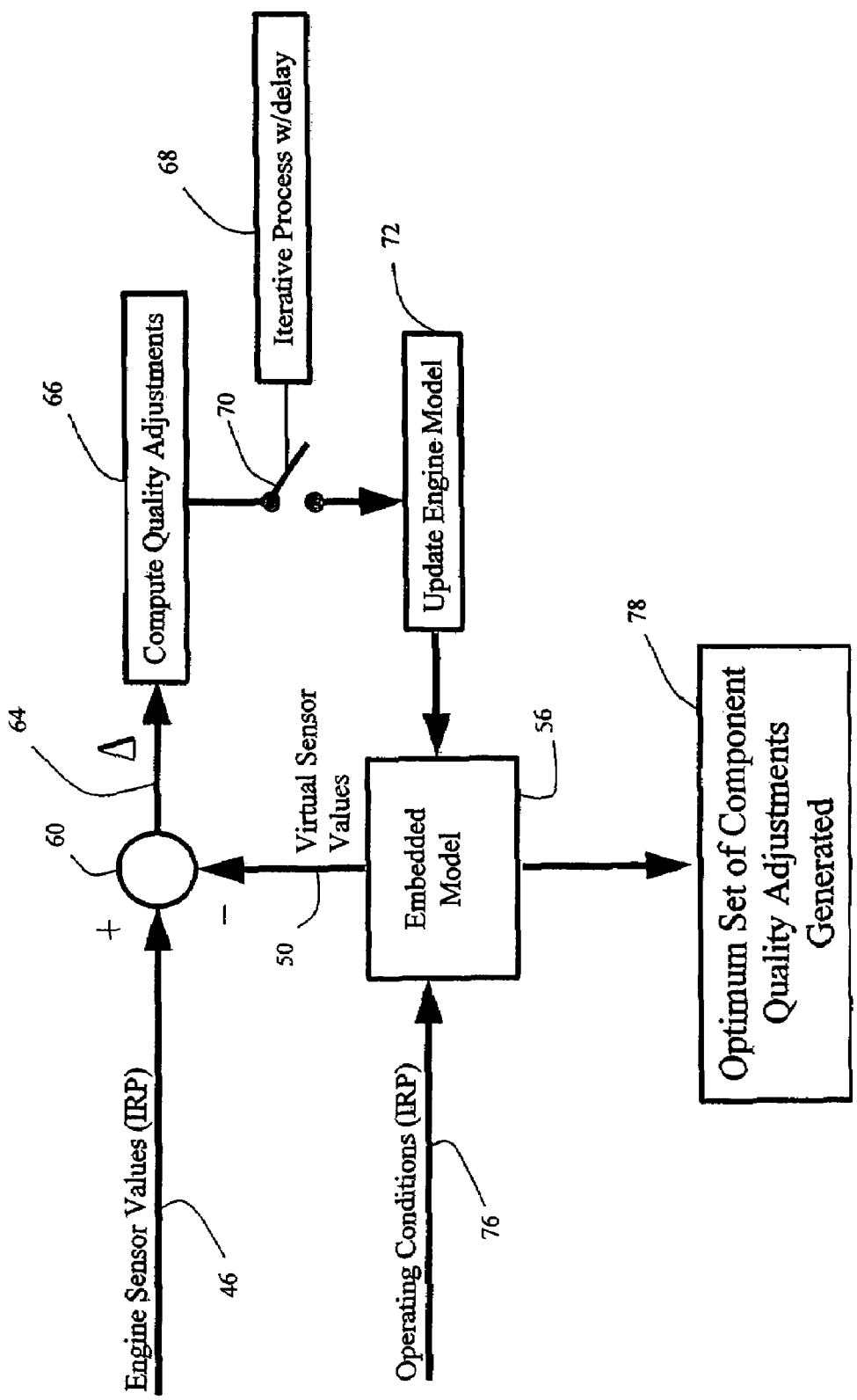
FIG. 3 is a diagram of a gas turbine quality estimation process.

Referring next to FIG. 3, a control diagram of the parametric quality estimation control method is described. The engine sensor values 46 measured at engine intermediate rated power (IRP), are input to a subtractor circuit 60. Model-computed values 50 are subtracted from the engine sensor values 46 and the difference (or delta) signal 64 is input to compute quality adjustments in control block 66. An iterative process 68 controls the sampling rate indicated as switch 70. The sampling rate is the rate at which the engine model is iteratively updated. Preferably the iterative process delay is about 250 milliseconds (ms).

The updated engine model 72 is updated every 250 ms by the computed quality adjustments 66. The updated engine model 72 is then input to the embedded model 56. Operating conditions 76 at IRP are also input to the embedded model 56. The embedded model 56 generates an optimum set of component quality adjustments 78, and also generates an updated set of model-computed sensors values 50 to close the feedback loop to the subtractor 60. The model-computed sensor values are subtracted from the IRP engine sensor values 46 again to begin another iteration. The iterative process performs continuous sampling, updating the engine model 56 every 250 ms —or other predetermined interval—during the flight.

Figure 4:
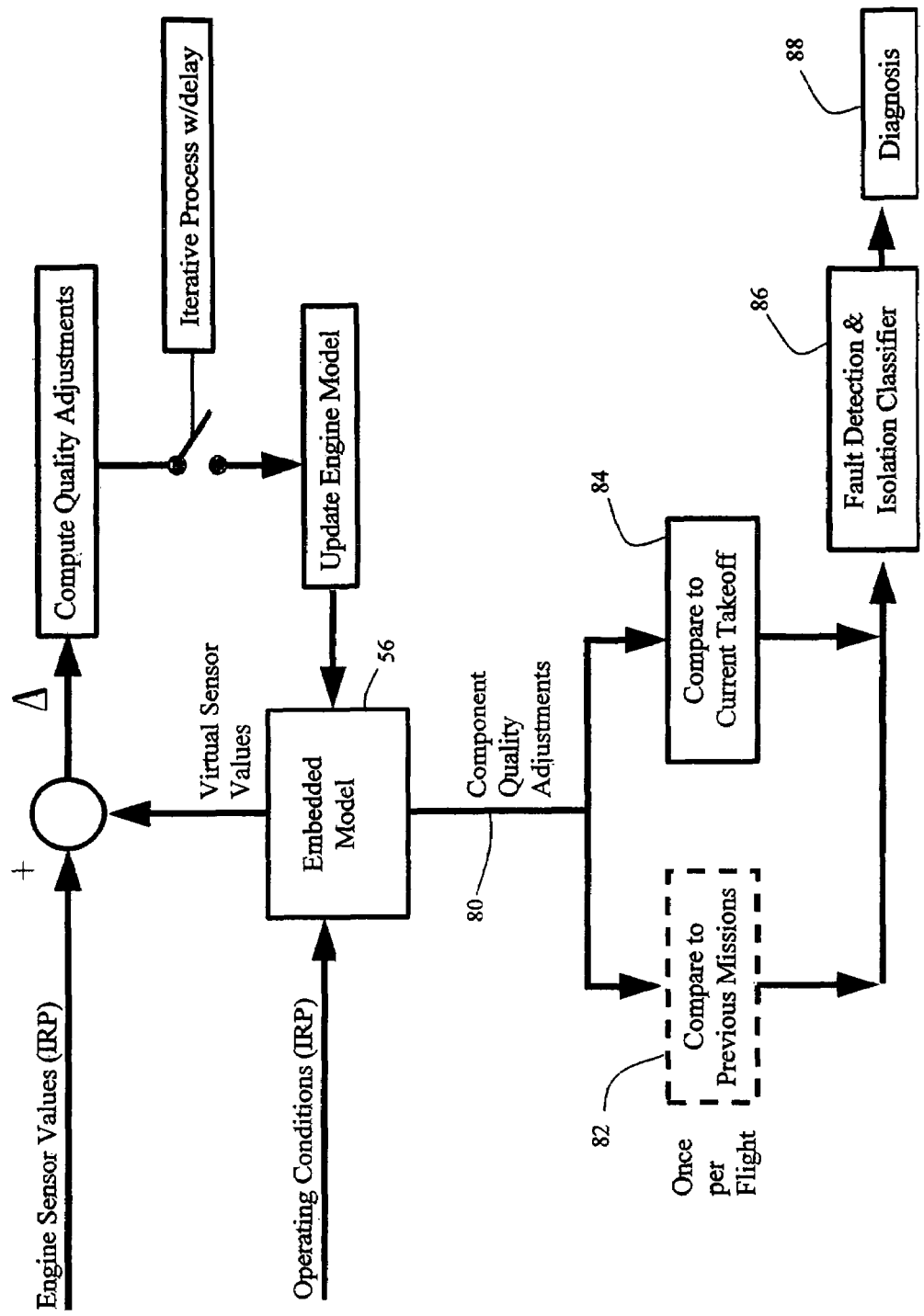
FIG. 4 is a diagram of a gas turbine fault detection/isolation process.

The iterative process described above may be employed in a quality optimization process shown in FIG. 4. The embedded model 56 outputs a set of component quality adjustments 80. The component quality adjustments 80 are compared to previous missions once per flight, as indicated at step 82. Thereafter, the component quality adjustments 80 are compared to the current take off quality parameters at step 84. The output of both steps 82 & 84 are connected to a fault detection and isolation classifier 86. The fault detection and isolation classifier 86 is then transmitted for diagnosis 88 of engine faults and in-range sensor failures.

These quality parameters are tracked using sensor values that are presumed to be accurate. However, when the signal drifts because of an in-range sensor failure, the deltas may be greater. The present invention is designed to detect such in-ranges sensor failures as well as common-mode failures, by recognizing anomalous patterns, as described above. The anomalous patterns may be determined by algorithms designed to identify unlikely events, such as an increase of engine efficiency. Also, anomalous patterns may be stored in a cumulative library, whereby a set of parameters matching a stored anomalous pattern would identify the in-range sensor failure, based on historical or model-generated patterns. In the event that an in-range sensor failure is detected in flight, the control system can substitute the model-computed sensor value in place of the failed sensor value.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for detecting in-range sensor failures in a gas turbine engine, the method comprising the steps of:
providing a component level model of a plurality of engine components, the component level model generating a plurality of estimated operating parameters and quality parameters;
sensing a plurality of operating parameters associated with the plurality of engine components;
comparing the plurality of sensed operating parameters to the plurality of estimated operating parameters of the component level model;
generating a set of engine component quality parameters based on the comparison of the plurality of sensed operating parameters to the plurality of estimated operating parameters;
storing a library of anomalous patterns, each pattern in the library of anomalous patterns comprising a plurality of known quality parameters corresponding to the generated set of engine component quality parameters; and
identifying a malfunctioning sensor in response to the generated set of engine component quality parameters matching at least one of the anomalous patterns.

2. The method as set forth in claim 1, also including substituting at least one of the estimated operating parameters of the component level model for at least one of the sensed operating parameters in response to identifying the malfunctioning sensor.

3. The method as set forth in claim 1, also including the step of updating the quality parameters of the component level model in response to comparing the plurality of sensed operating parameters to the plurality of estimated operating parameters.

4. The method of claim 1, wherein the plurality of engine components includes a fan, a compressor, a high-pressure turbine and a low-pressure turbine.

5. The method of claim 4, wherein the plurality of engine components also includes a booster.

6. The method of claim 4, wherein the quality parameters include a flow parameter and an efficiency parameter.

7. The method of claim 6, wherein at least one of the quality parameters is adjustable from a nominal value.

8. A control system for a gas turbine engine having a plurality of components, the control system comprising:
a control module to transmit control commands to the engine;
a plurality of component sensors to sense at least one operating parameter associated with each component of the plurality of components;
a component level model to generate a plurality of estimated engine component parameters, the component level model comprising an individual model for each component of the plurality of components, each individual model having at least one estimated operating parameter and a plurality of quality parameters;
a tracking filter to monitor changes in the sensed operating parameters with respect to the component level model estimated operating parameters, the tracking filter configured to generate an updated set of quality parameters based on the monitored changes; and
a pattern recognition module including a data storage unit storing a library of anomalous patterns, each pattern in the library of anomalous patterns comprising a plurality of known quality parameters corresponding to the generated set of engine component quality parameters, the pattern recognition module also including logic configured to identify when the updated set of quality parameters matches at least one anomalous pattern of the library of anomalous patterns, and to determine a failed sensor in response to matching the set of updated quality parameters with at least one anomalous pattern of the library of anomalous patterns.

9. The system set forth in claim 8, wherein the tracking filter is configured to:
receive at least one sensed operating parameter for each of the plurality of engine components;
compare the received at least one sensed operating parameter with a corresponding estimated operating parameter from the component model;
generate a set of quality parameters for a subset of the plurality of engine components; and
output the computed set of quality parameters for processing by the pattern recognition module.

10. The system set forth in claim 8, wherein the quality parameters in each individual model are iteratively updated from the updated set of quality parameters.

11. The system set forth in claim 8 wherein the component level model is one of a physics-based model, a regression fit model or a neural network model.

12. The system set forth in claim 8 wherein the library of anomalous patterns are derived from historical data identifying anomalous patterns, or generated by at least one algorithm configured to determine an anomalous pattern.

13. The system set forth in claim 8 wherein the sensed operating parameters include rotor speed, temperature and pressure.

14. The system set forth in claim 8, also including a plurality of computed parameters based on a plurality of input parameters.

15. The system set forth in claim 14 wherein the computed operating parameters include stall margin, thrust and airflow.

16. The system set forth in claim 14 wherein the plurality of input parameters include environmental conditions, power setting and actuator position.

17. The system set forth in claim 8, wherein the control module includes a microprocessor, memory and I/O devices.

* * * * *